(12) United States Patent
Richardson

(10) Patent No.: US 6,865,516 B1
(45) Date of Patent: Mar. 8, 2005

(54) METHOD OF RECORDING THE TEMPERATURE OF PERISHABLE PRODUCTS IN COLD CHAIN DISTRIBUTION

(75) Inventor: Donald George Richardson, Clontarf (AU)

(73) Assignee: Ceebron PTY Limited, North Ryde (AU)

( * ) Notice: Subject to any disclaimer, the term of this patent is extended or adjusted under 35 U.S.C. 154(b) by 0 days.

(21) Appl. No.: 09/830,727

(22) PCT Filed: Nov. 1, 1999

(86) PCT No.: PCT/AU99/00946

§ 371 (c)(1),
(2), (4) Date: Apr. 30, 2001

(87) PCT Pub. No.: WO00/26111

PCT Pub. Date: May 11, 2000

(30) Foreign Application Priority Data

Oct. 30, 1998 (AU) .............................................. PP6863

(51) Int. Cl.⁷ ................................................ G06F 11/06
(52) U.S. Cl. .................................. 702/188; 340/870.17
(58) Field of Search ......................... 702/188, 62, 122; 340/3.1, 3.2, 870.11, 870.17; 700/9–14

(56) References Cited

U.S. PATENT DOCUMENTS

| | | | | |
|---|---|---|---|---|
| 4,897,662 A | * | 1/1990 | Lee et al. ................... | 343/701 |
| 5,025,486 A | * | 6/1991 | Klughart ..................... | 340/3.1 |
| 5,132,968 A | | 7/1992 | Cephus | |
| 5,381,136 A | | 1/1995 | Powers et al. | |
| 5,434,394 A | | 7/1995 | Roach et al. | |
| 5,502,656 A | | 3/1996 | Fulcher et al. | |
| 5,552,772 A | | 9/1996 | Janky et al. | |
| 5,694,551 A | | 12/1997 | Doyle et al. | |
| 5,751,246 A | * | 5/1998 | Hertel .................... | 342/357.07 |
| 5,892,441 A | * | 4/1999 | Woolley et al. ............. | 340/539 |
| 6,239,700 B1 | * | 5/2001 | Hoffman et al. ............ | 340/539 |
| 6,353,390 B1 | * | 3/2002 | Beri et al. ................ | 340/572.1 |

FOREIGN PATENT DOCUMENTS

| | | |
|---|---|---|
| DE | 19522 392 A1 | 1/1997 |
| DE | 19649136 A1 | 5/1998 |
| DE | 29806583 U1 | 7/1998 |
| EP | 0 770 967 A3 | 5/1997 |
| EP | 0 845 747 A3 | 2/2000 |
| FR | 2 710 170 | 3/1995 |
| WO | WO96/13022 | 5/1996 |

OTHER PUBLICATIONS

Abstract No. 98–2020/25—JP 10097691–A, (Apr. 14, 1998).
Abstract No. 97–409486/38—JP 09182145–A (Jul. 11, 1997).
Abstract No. 98–135622/13—JP 10011674–A, (Jan. 16, 1998).
TempAssure User's Guide, Copyright 1998, Cover and pp. 1–4.
Grant 500 Series Squirrel Brochure, Jul. 1993, 2 pp.
Grant 500 Series Squirrel Technical Specification, Feb. 1994, 4 pp.
Temperature Monitoring in the Cold Chain, May 23, 1996, 3 pp.
500 Series Squirrels–the reliable link in the cold chain, 4 pp.

* cited by examiner

Primary Examiner—Marc S. Hoff
Assistant Examiner—Edward Raymond
(74) Attorney, Agent, or Firm—Leydig, Voit & Mayer, Ltd.

(57) ABSTRACT

A method and apparatus for monitoring a consignment of goods including measuring a predetermined parameter or parameters of said consignment using a disposable device (7) attachable to said consignment; transmitting a signal containing data representative of the measured parameter to a central location (14) and maintaining a database (11) relating to said consignment at said central location (14), said database (11) including the data representative of said measured parameters. The database (11) may include temperature, time and location data associated with a consignment. The database (11) may be accessed remotely via a secure access link (15).

22 Claims, 4 Drawing Sheets

FIG. 3

| | |
|---|---|
| Consignor Password (secure ****) | Consignor input Data for XYZ System<br>(Keyed into computer at time of Loading)<br>Green  Blue  Black  Red |

Consignment Attributes

Sender Type / Colour

Sender Serial Number (* * ***)

Date / Time (yyyy/mm/dd/hh/mm)

Expected Transit Time (dy/hr)

Maximum Transit Temperature (°C)

Pitch (Report signal interval in min.)

Hotline Number (  ** **)

Alert 1 (red line)-Over Temperature (°C)

Alert 2 (blue line)-Under Temperature (°C)

Consignor Company Code

Consignor Location Code

Consignor Product Code

Consignor Batch Identity Code

Consignee Order Number

Consignee Destination (Country/City)

US 6,865,516 B1

METHOD OF RECORDING THE TEMPERATURE OF PERISHABLE PRODUCTS IN COLD CHAIN DISTRIBUTION

TECHNICAL FIELD

The present invention relates to the continuous monitoring and ready retrieval of time, temperature and other consignment data of perishables products, as they are transported between processor (consignor) and ultimate retailer sites (consignee), along what is referred to as the cold chain, and, more particularly to a method and apparatus for enabling such monitoring in an efficient and low cost manner. Although the invention will be described in terms of its application to a cold chain, it will be appreciated that the invention is equally applicable to other forms of consignment system.

BACKGROUND ART

There has been a significant trend to the use of more perishable, fresh, chilled (and frozen) foods, beverages and temperature sensitive biomedical and pharmaceutical products, compared with the temperature stable, processed or preserved substitute products. At the same time there is an increasing concern by consumers and governments to ensure the quality and safety of these temperature sensitive perishable products, is not jeopardised by hazardous handling prior to consumption. New temperature management tools are useful to minimise these handling hazards in domestic and international trade.

Various types of temperature measurement and recording equipment have been used in the past for this task and record of these are discussed below.

The family of portable reusable data loggers that are placed in perishable product consignments by the shipper to be retrieved and the stored temperature and time data downloaded by either linking to a programmed personal computer, or by removing a printed chart, have been in use by the food and pharmaceutical industries for many years. These robust, portable recorders arc expensive and need to be returned to the shipper on consignment completion. Additionally the data is not accessible until the logger is ultimately read and this maybe after a product recall or hold, should have been triggered. This means that the monitoring devise cannot be as widely used as safe product temperature management directs.

Refrigerated transportation vehicles and shipping containers used for perishable goods transfer have recording chart thermometers for recording the temperature of the interior space. These charts are specific for each vehicle in the cold chain and do not capture the product consignment temperature and time as the product moves between vehicles in the supply chain. It is therefore difficult to marry the charts with specific consignments on other than a post-mortem basis which is not as responsive as industry shippers would like, in terms of being able to anticipate and respond to potential temperature abuse hazards during distribution. As such they do not provide a seamless data stream throughout cold chain distribution The cumulative time and temperature effect is also indicated by a chemically based product, Monitor Mark™. These time/temperature integrators are monitoring tools that provide a visual, non reversible, indication of time and temperature exposure above a pre-set threshold temperature. This is accompanied by the appearance and migration of a blue colour, left to right through a series of viewing windows on a rectangular flat laminate containing layers of paper film, adhesive and other active chemical components. These strips are typically 96 mm by 20 mm and while relatively inexpensive, only indicate, as distinct from measure, product exhibiting time temperature abuse sensitivity and represent a signal as to when product quality should be checked prior to use.

The temperature, time and location state of air-freight consignments of perishable products are also recorded in a specially designed aluminium 'Envirotainer'. This is a returnable unit, typically owned by the airline, and is a capital expensive solution to the problem of temperature management for just a part of the cold chain.

DISCLOSURE OF THE INVENTION

The present invention seeks to provide all the advantages of the above systems together while overcoming or at least ameliorating one or more of the disadvantages of the prior art. Desirably, at least in its embodiments, the invention will provide the advantages of being able to economically continuously monitor and record desired parameters (for example, temperature, time and location) of a consignment from the production point to the retailer warehouse or outlet. Preferably, where perishable goods are being consigned, the invention may provide in-built alerts to signal consignment temperature (or location) abuse from a specified condition and a potential spoilage predictor, consistent with the reduction of distribution related, food safety and food quality risks.

The present invention provides in one aspect, a method of monitoring a consignment of goods comprising the following steps:

measuring a predetermined parameter or parameters of said consignment using a disposable sender device attachable to said consignment;

transmitting a signal containing data representative of said measured parameter to a central location; and maintaining a database relating to said consignment at said central location, said database including said data representative of said measured parameters;

initiating said database to include consignment data for each consignment; and providing secure communication access to said database to enable monitoring by enabled users of data available from said database.

Preferably, the parameter or parameters are measured continuously or at predetermined intervals and said data includes time indicative data associated with said measurements. For preference, the method includes the step of communicating the data to an intermediate sender device provided at the location of the consignment and transmitting the collected data from the intermediate sender device to the central location.

Preferably the method further includes the step of determining the location of the consignment and including data representative of the determined location in the data transmitted to the central location.

For preference, the database includes set point values associated with the consignment for one or more of the measured parameters and the method includes comparing measured values with corresponding set point values to determine whether the consignment is meeting predetermined conditions.

According to a second aspect the present invention provides a system for monitoring a consignment of goods including:

a sender device attachable to said consignment including a measurement means for measuring a predetermined parameter or parameters of said consignment;

first communication means for transmitting a signal containing data representative of said measured parameter to a central location; and computer system means for maintaining a database relating to said consignment at said central location, said database including said data representative of said measured parameters and wherein said database is initiated to include consignment data for each consignment, and a secure communication access means for providing access to said database to enable monitoring by enabled users of data available from said database.

Preferably, the system includes the first communication means in said sender device for communicating the data to an intermediate sender device provided at the location of the consignment and a second communication means being included in the intermediate sender device for transmitting the data from the intermediate sender device to the central location.

For preference, the system includes a location determining means for determining the location of the consignment and means for including data representative of the determined location in the data transmitted to the central location.

In one embodiment the attachable sender device is a small adhesively backed, robustly designed, inexpensive and non-returnable, battery powered, temperature monitor and sender. This sender device is fastened to pallet loads of perishable products that may require shipment between specified temperature ranges to ensure food safety risks are eliminated and food quality is maximised. Typically, chilled foods being kept at 4° C. or below and, frozen foods at −18° C. or below.

Preferably, the sender/s and tracker are generating location and time data signals, together with the accurate temperature signals, and these signals are communicated to a central database operated on behalf of numerous perishables freight originators. Such mobile communication of simple data signals is via appropriate technologies depending on specifics of location tracking discrimination, and global location, but normally would be via global systems for mobile phone (GSM) for terrestrial movements, together with triangulation for reasonable location precision and, via satellites for global positioning system (GPS), for more precise location data and certain specific country applications.

Preferably, the signals sent to the central database by the sender are integrated with other consignment data. This other data can be sent directly and electronically to the database by the consignment originator, such as dispatch date, time, product and manufacturing code, time/temperature tolerance ranges for abuse determination and recall alert, together with, preferred report page layout formats and company identification headers, for the ultimate output printing or communicating, in terms of time temperature/location plots, including geographic charts for visual tracking purposes.

Preferably, the signals are sent by senders attached to pallet loads of perishable products being transported both domestically and internationally, with likely transit times from overnight, to 30+days duration, in the case of refrigerated containerised shipments on international routes.

Senders for different temperature and time ranges may have differing battery lives, designed temperature ranges and associated distinguishing marks to facilitate easy sender product selection and use.

Typically, the signal functionality and pitch intervals of the sender is kept to a minimum and the database infrastructure provides as much consignment information as possible for overall data processing, to ensure that the manufactured cost and price of the disposable, mass produced senders, is low in relation to the profit potential of each pallet consigned. Low sender prices motivate high usage of the system, consistent with enhancing the safety and quality of the cold chain in this country and its export markets. Superior supply chain performance enhances overall competitiveness in global business. The system permits transparent scrutiny of supply chain service providers delivery and ready measurement of their key performance indicators including driver stops and fatigue.

Typically, the central data-base is accessed by the consignor via Internet communication linkup, on a secure basis, by logging onto the system with a password via a desktop, or laptop or portable computer, in an office, or from the field, location and the specific details of every pallet consigned with a sensor, can then be viewed or printed out, via the consignor's home page. The regular or automatic interrogation of the system confirms safe shipment progress or shipment completion, but also additionally identifies any abused shipment and its location for earlier recall intervention, if required. Alternatively, the central data-base can be selectively and securely linked to a consignee's mainframe computer system so that information is automatically captured and exception reporting and recall alerts only require management intervention.

Preferably, the accuracy of the temperature data provided (0.5° C. accuracy) in hard copy form can be so calibrated and validated as to provide a solid legal foundation for consignor dialogue with receiving party and transporting parties and so facilitate dispute resolution between such parties, minimise the effect of the human frailties inherent in the current supply cold chain, and generally provide a tool for heightening awareness of the importance of the cold chain management in providing safe, quality food and other perishables.

Typically, pallet loads of perishable products (or smaller units than a pallet, such as a single shipping carton in the case of high value products like certain live or chilled seafood or biomedicals/pharmaceuticals) are transhipped from processor or consignor by refrigerated truck, railcar, shipping container and ultimately by air-freight in certain cases, before reaching their destination. The communication of the specific sender signal has therefore some barriers to ready transmission. For this reason the sender may have a limited capacity memory, to retain the signal stream until the transmission interruption ends and once again allows signal to be sent to the central data-base.

In the preferred embodiment of the invention, the sender signal stream from a loaded truck or shipping container, may in the first instance be received by an on-board reader/tracker, tuned to the system rf signal frequency to minimise such interference, and then communicated to the central database for real-time integration of the perishable shipment's temperature and location status, with the other company specific data. The other company data may be consistent with scannable EAN128/SSCC (Serial Shipping Container Code), together with certain specific keyed in data, like sender identity.

Other embodiments of the invention can have only part of the sender system capability being used at times, for instance as an intelligent consignment tag, where location data is important but temperature ignored, as in very valuable dry goods distribution where pilfering and consignment theft are a risk—cigarettes/whisky; or, in instances where the temperature data and alert capability is important, but location data ignored, as in storage of frozen products in a coldstore, where a hotline message from the database could alert management that the coldstore had developed a fault during a period when unattended, and that stored product temperatures were rising dangerously.

DESCRIPTION OF DRAWINGS

The invention will be more fully understood from the following description of a preferred embodiment which is illustrated, by way of example only, with reference to the accompanying drawings in which:

FIG. 3 is a diagram of the consignor's Input Data Report format; and

MODES FOR CARRYING OUT THE INVENTION

Figure 1:
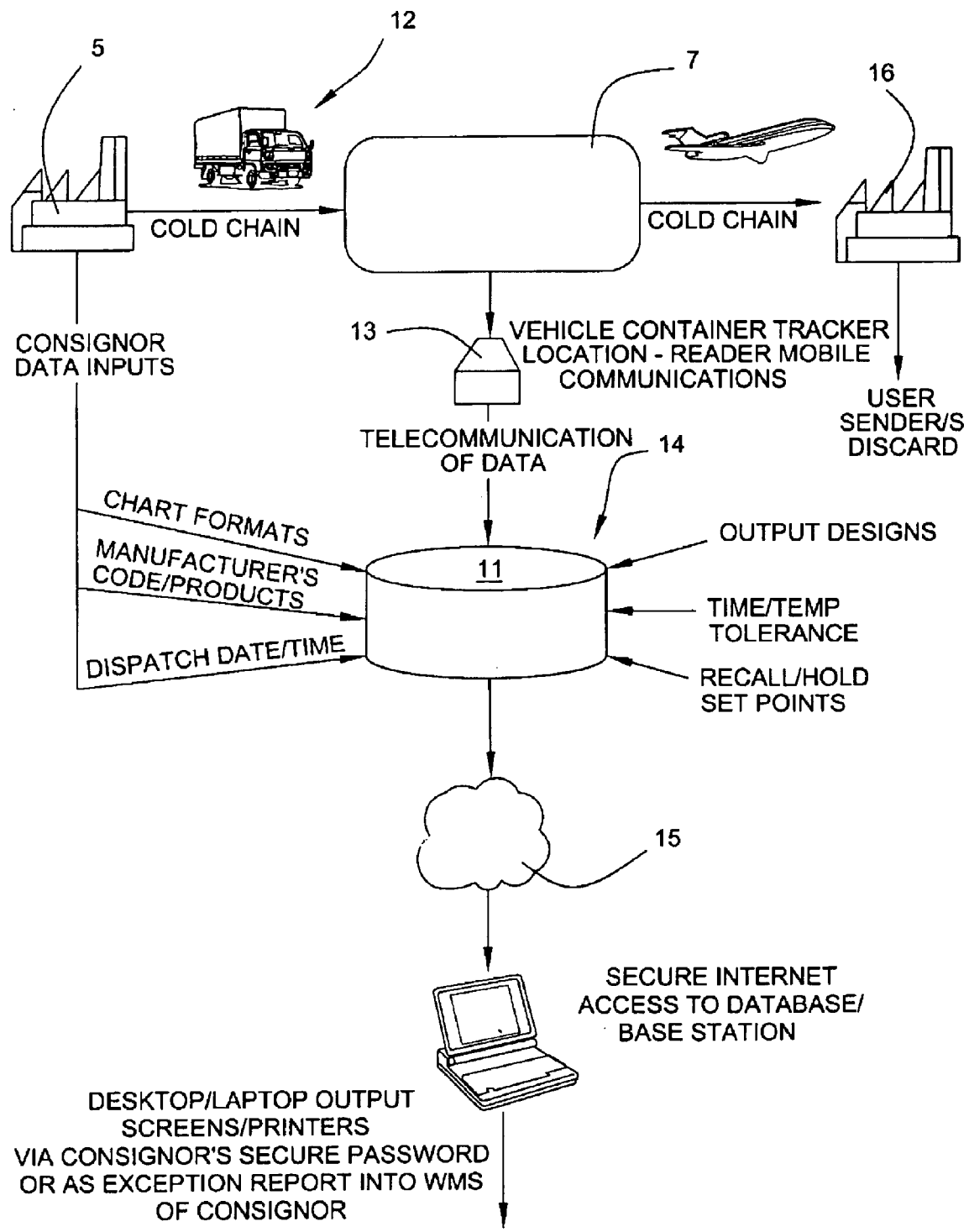
FIG. 1 is a schematic block diagram of the information system network according to one embodiment of the invention.
Figure 2:
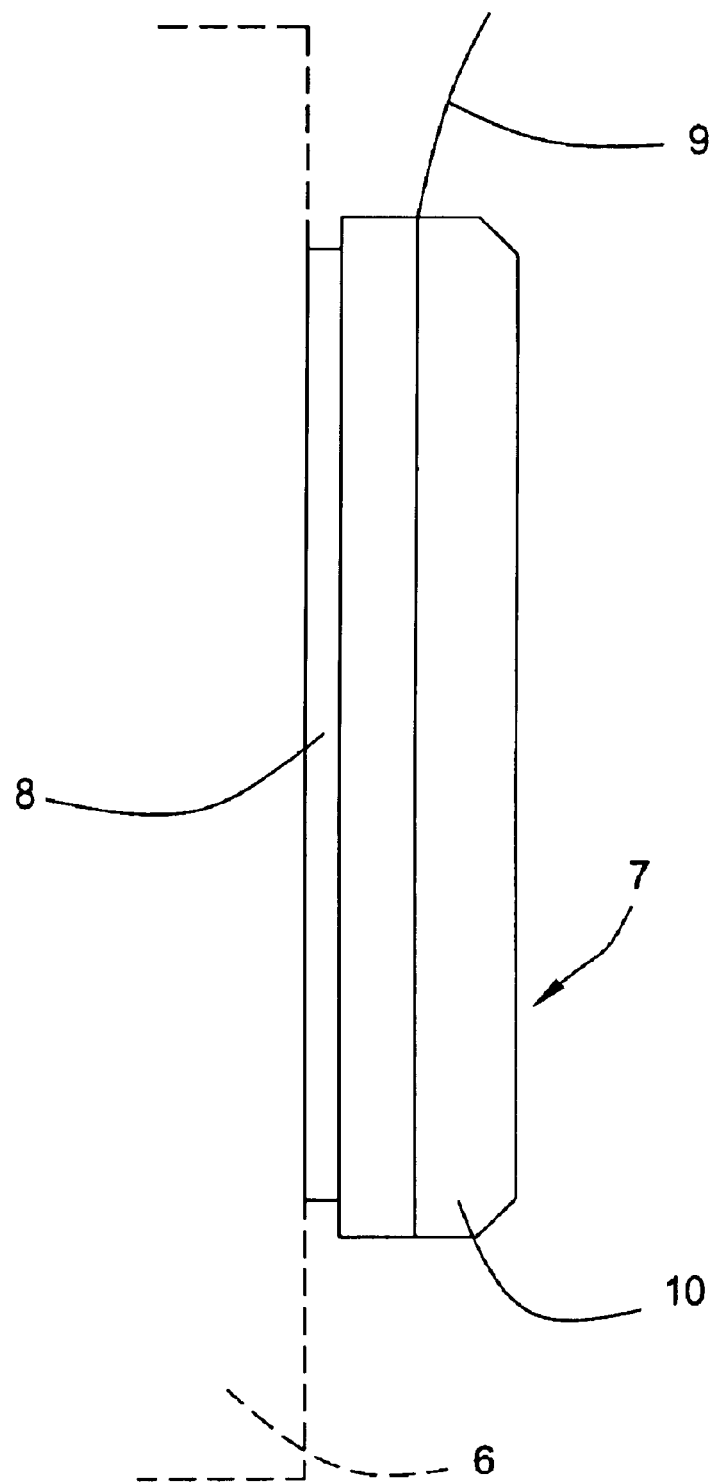
FIG. 2 shows a side elevation of an attachable sender device according to one embodiment of the invention.
Figure 4:
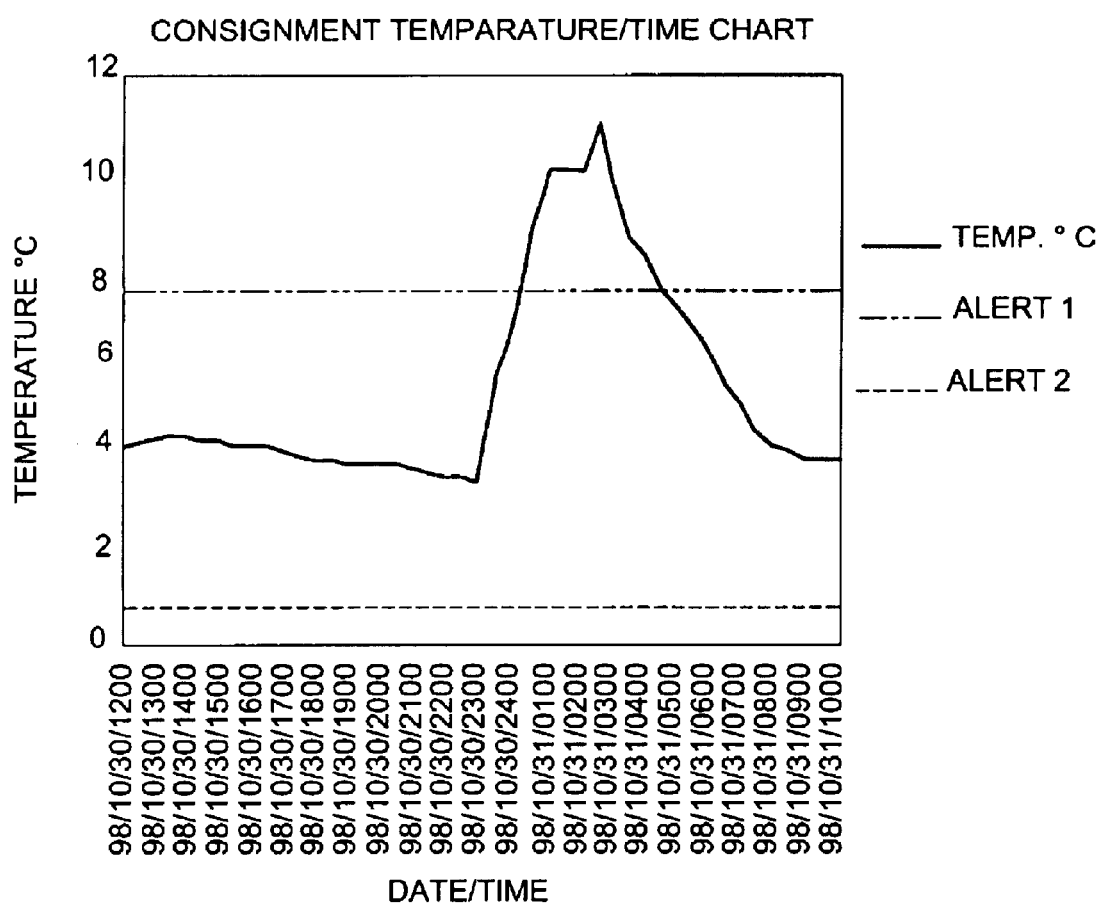
FIG. 4 is a diagram of a typical output status report printed from the central data-base, via the Internet at the consignor's desktop computer, showing the temperature and travel time history to the current location, in real time.

Referring to the Figures, the consignor warehouseman 5 of a perishable product 6 selects the correct sender device 7 for the specific duty and attaches that sender device 7 by peel back adhesive tab 8 to the pallet consignment (not shown) at an optimum and designated position. The sender device 7 is activated at the time of dispatch by pulling tag 9 that irreversibly activates a battery, and, the sender specific data, which is normally indicated on the sender casing 10 by a label or other readable indicia (e.g. barcode), is then entered into the central database 11 by the warehouseman 5 (sender number, manufactures code for product, customer, date, time, report format, etc.) from his desk top computer, via modem linkage to the central database 11. An example of the consignment attribute data is shown in FIG. 3. During a consigmnent's movement along the cold chain 12 the sender device 7 transmits its data stream (via reader/tracker 13 as required) to the database 11 at a central location 14 where it is integrated with the stored data from warehouseman 5 in the database 11 for retrieval by Internet connection 15 by the consignor, at any convenient time and from any convenient location by the use of the consignor's specific password at the time of logging onto the system. An example of the type of information available is shown in FIG. 4. The sender device 7 is removed from the consignment at the end of the cold chain 12 with the battery drained, and is responsibly disposed of by consignee warehouse 16 staff, on the formal receipt of the perishable product shipment.

The consignor now has an exact temperature record of the delivery of the shipment to a specific distribution warehouse, possibly on the other side of the continent, or into demanding export markets, after pallet/s has been transhipped a number of times from truck to railcar to container ship or plane to truck. The consignor knows the temperature, location, identity of the shipment, and the ultimate customer warehouse location, in real-time, right up to delivery acceptance by the customer. Additionally the consignor has an in-built integrator of time and temperature abuse, which would signal the need to recall (or hold) the particular pallet, due to some distribution failure and hence safety or quality concern.

The use of this information systems approach to consignment temperature management along the cold chain indicates the shipper's responsible attitude to the superior delivery of its products and protects and enhances the consignor's corporate identity in the market place.

In the preferred operation of the system, responsible shippers of perishable products adopting the system, would be able to negotiate more favourable insurance premiums for the in-transit protection of their product so adding to the overall cost benefit of the adopted temperature management system. Additionally the consignor can easily maintain electronic records of past shipments for ready retrieval, should later insurance or quality disputes arise. The past consignment data can be kept for as long as the consignor deems necessary.

It will be appreciated that standard componentry such as miniature transmitters, temperature monitors and other standard forms of communication equipment can be used to implement the invention, though in some cases it would be desirable to use custom designed hardware.

It will be apparent that further embodiments and exemplifications of the invention are possible without departing from the spirit or scope of the invention described.

What is claimed is:

1. A method of monitoring a consignment of goods, the method comprising:

continuously or at predetermined intervals measuring a parameter of the consignment using a disposable sender device attached to the consignment;

continuously or at predetermined intervals transmitting a signal containing data representative of the measured parameter to a database, the data comprising time-indicative data associated with the measured parameter, the database comprising a set-point value associated with the consignment for the measured parameter;

comparing the measured parameter with the associated set-point value; and if the measured parameter is not within a range specified, at least in part, by the set-point value, then initiating an intervention.

2. A method of monitoring according to claim 1 wherein the parameter is a temperature of the consignment.

3. A method of monitoring according to claim 1, further comprising:

communicating the data to an intermediate sender device provided at a location of the consignment; and transmitting the data from the intermediate sender device to the database.

4. A method of monitoring according to claim 1, further comprising:

determining a location of the consignment; and including data representative of the determined location in the data transmitted to the database.

5. A method of monitoring according to claim 1, further comprising:

storing the data in a storage means before transmission to the database.

6. A method of monitoring according to claim 5 wherein the storage means is provided in an intermediate sender device.

7. A method of monitoring according to claim 1, further comprising:
   initializing the database to include consignment data wherein the consignment data include dispatch and product data.

8. A method of monitoring according to claim 1, further comprising:
   providing secure communication access to the database to enable monitoring by enabled users of data available in the database wherein the secure communication access is provided via an Internet.

9. A system for monitoring a consignment of goods, the system comprising:
   a sender device attached to the consignment and comprising a measuring device for continuously or at predetermined intervals measuring a parameter of the consignment;
   a transmitter for continuously or at predetermined intervals transmitting a signal containing data representative of the measured parameter to a database, the data comprising time-indicative data associated with the measured parameter;
   the database, the database comprising a set-point value associated with the consignment for the measured parameter;
   a comparator for comparing the measured parameter with the associated set-point value; and
   an initiator for initiating an intervention if the measured parameter is not within a range specified, at least in part, by the set-point value.

10. A system for monitoring according to claim 9 wherein the parameter is a temperature of the consignment.

11. A system for monitoring according to claim 9 wherein the sender device comprises the transmitter,
    wherein the transmitter communicates the data to an intermediate sender device, and
    wherein the system further comprises the intermediate sender device, the intermediate sender device comprising a second transmitter for transmitting the data to the database.

12. A system for monitoring according to claim 11, further comprising:
    a location finder for determining a location of the consignment, and
    wherein the data transmitted to the database comprise data representative of the determined location.

13. A system for monitoring according to claim 12 wherein the location finder comprises a global positioning system.

14. A system for monitoring according to claim 12 wherein the intermediate sender device comprises the location finder.

15. A system for monitoring according to claim 11, further comprising a data store for storing the data before transmission to the database.

16. A system for monitoring according to claim 15 wherein the intermediate sender device comprises the data store.

17. A system for monitoring according to claim 9 wherein the sender device is disposable and battery powered.

18. A system for monitoring according to claim 11 wherein the sender device is disposable and inductively powered from the intermediate sender device.

19. A system for monitoring according to claim 9 wherein the database comprises consignment data, and
    wherein the consignment data comprise dispatch and product data.

20. A system for monitoring according to claim 9, further comprising secure communication access to the database to enable monitoring by enabled users of data available in the database wherein the secure communication access is provided via an Internet.

21. A method of monitoring according to claim 1, wherein initiating an intervention comprises recalling the consignment.

22. A computer-readable medium containing computer-executable instructions for performing a method of monitoring a consignment of goods, the method comprising:
    continuously or at predetermined intervals measuring a parameter of the consignment using a disposable sender device attached to the consignment;
    continuously or at predetermined intervals transmitting a signal containing data representative of the measured parameter to a database, the data comprising time-indicative data associated with the measured parameter, the database comprising a set-point value associated with the consignment for the measured parameter,
    comparing the measured parameter with the associated set-point value; and
    if the measured parameter is not within a range specified, at least in part, by the set-point value, then initiating an intervention.

* * * * *